July 19, 1955    K. BAUMANN    2,713,495
COLLAPSIBLE TROLLEY
Filed Nov. 8, 1951    3 Sheets-Sheet 1
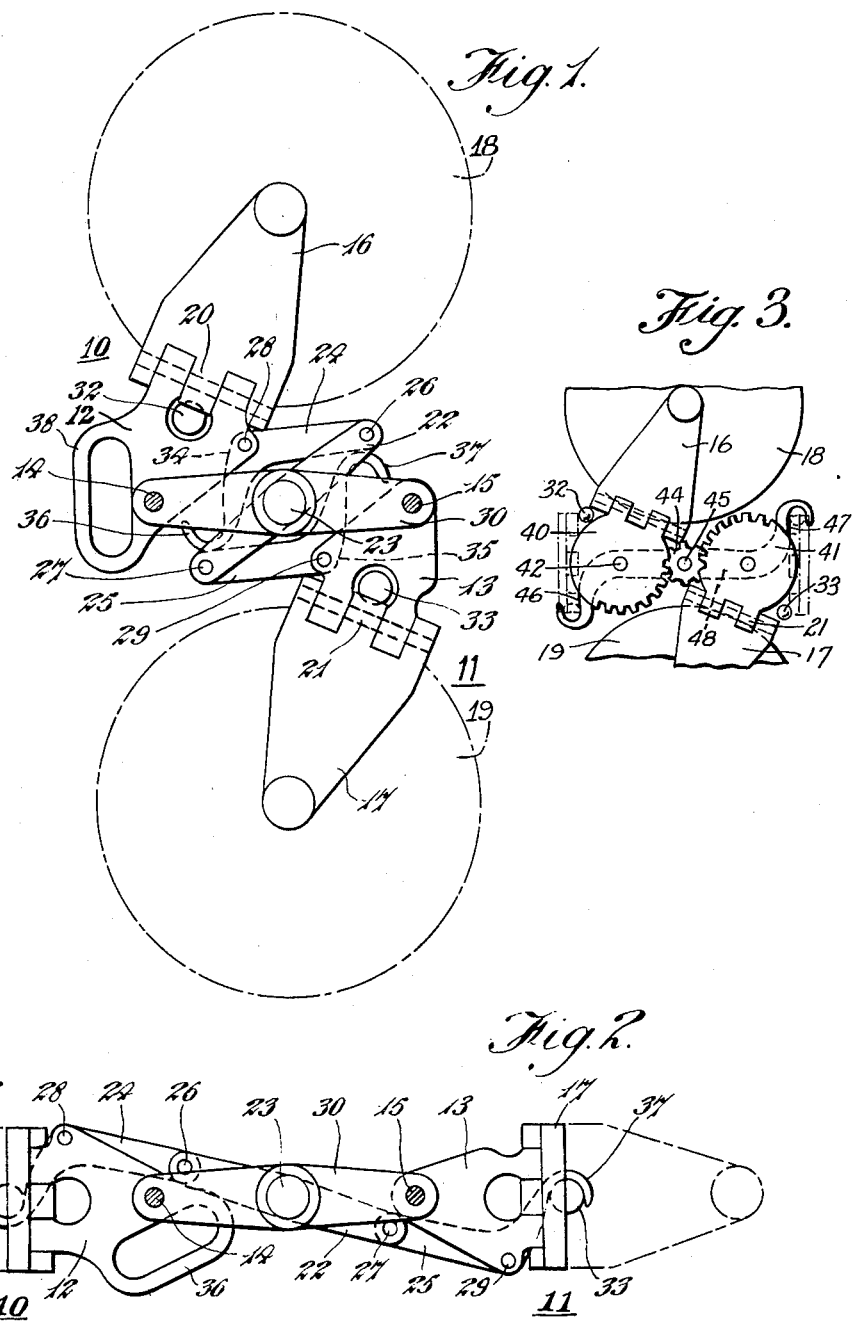
INVENTOR
Karl Baumann
By Kevais L. Otterson
ATTORNEYS July 19, 1955 K. BAUMANN 2,713,495
COLLAPSIBLE TROLLEY
Filed Nov. 8, 1951 3 Sheets-Sheet 2
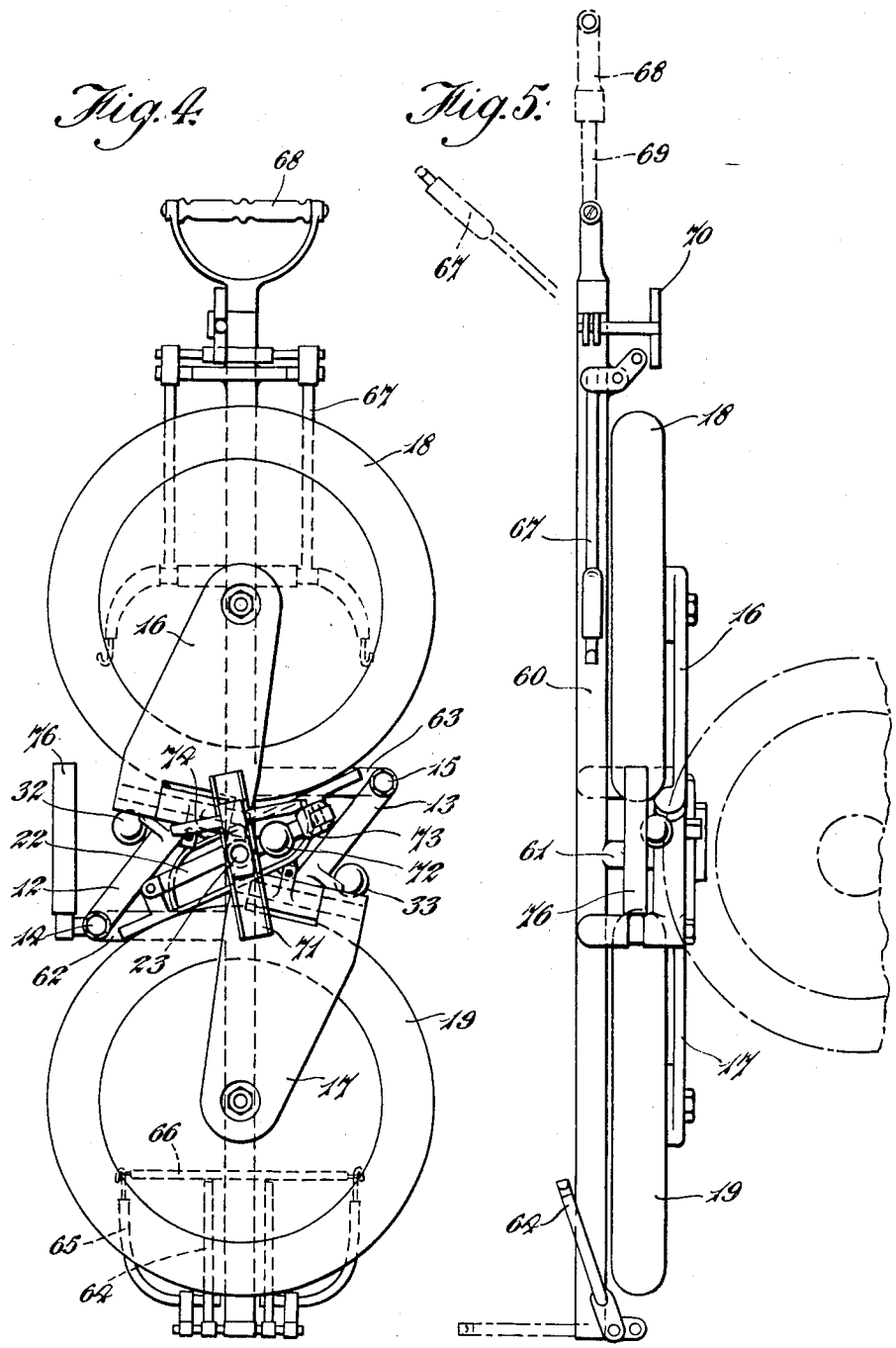
INVENTOR
Karl Baumann
By Harris & Pittman
ATTORNEYS July 19, 1955 K. BAUMANN 2,713,495
COLLAPSIBLE TROLLEY Filed Nov. 8, 1951 3 Sheets-Sheet 3

INVENTOR
Karl Baumann
By
ATTORNEYS

United States Patent Office 2,713,495
Patented July 19, 1955

2,713,495

COLLAPSIBLE TROLLEY

Karl Baumann, Wilmslow, England

Application November 8, 1951, Serial No. 255,408

20 Claims. (Cl. 280—40)

This invention relates to collapsible trolleys, that is to say trolleys in which the wheels may be moved between a collapsed position, when the trolley can be stored or carried, and an operative position when the trolley may be wheeled. Although the invention may be applied to any form of trolley, whether two or four wheeled, it has particular application to two-wheeled trolleys suitable for carrying golf clubs during play.

Many forms of collapsible trolley are known, but in general such trolleys fail to meet certain essential requirements, both in regard to their collapsed state and to their operation from the collapsed to the operative position. Thus, when collapsed, the trolley should occupy the smallest possible volume and in the case of a trolley for golf clubs should be capable of being stored in golf lockers of the size in customary use. It is also most desirable that when opening and closing the trolley the mechanism should be so balanced as to be easily operated by one hand without appreciable physical effort and without touching or handling the wheels.

The invention therefore has for its principal object the provision of an improved collapsible wheel mounting which is effective to hold the wheel in one plane when collapsed and in a plane at right angles thereto when in operative position.

A further object of the invention is the provision of a new and improved collapsible trolley in which the wheels, when in collapsed position, lie side by side substantially in a common plane, while when in operative position extend in parallel planes at right angles to the said common plane.

The invention, both as to its organisation and use, together with further objects and advantages thereof, may best be understood by reference to the following description taken in connection with the accompanying drawings, in which:

Figs. 1 and 2 are diagrammatic plan views of one form of collapsible wheel mounting in the collapsed and operative positions respectively;

Fig. 3 is a diagrammatic plan view of a further form of collapsible wheel mounting;

Figs. 4 and 5 are respectively a side and end view of a collapsible trolley for golf clubs; while

Figure 6:
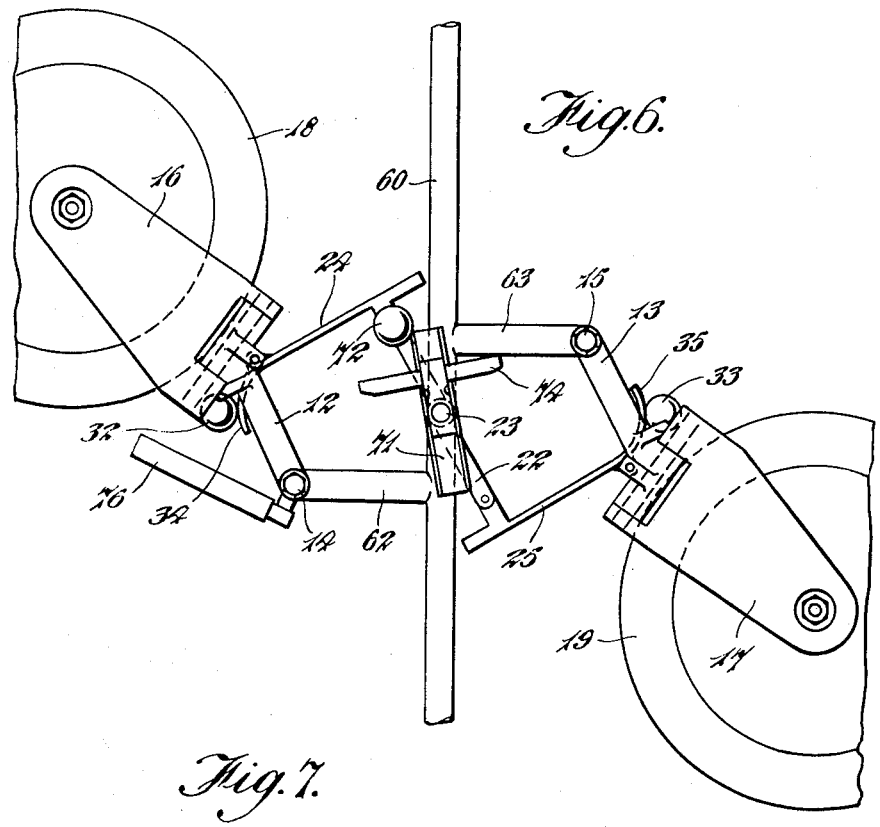
Figs. 6 and 7 are fragmentary views of the trolley of Fig. 4 showing the wheels in the partly and fully erected position.

Referring now to Figs. 1 and 2, the wheel mounting there shown consists of wheel arms 10, 11 which comprise an inner part 12, 13 mounted on fixed pivots 14, 15, and an outer part 16, 17, which carries a mounting for a wheel 18, 19, and is joined to the inner part by a hinge 20, 21 so that it can be moved upwardly from the plane containing the inner part to a position at right angles thereto. A lever 22 is pivoted centrally on a further fixed pivot 23 and is connected at its ends with the inner parts 12, 13 of the wheel arms by means of the links 24, 25 which are pivotally connected at 26, 27 with the lever and at 28, 29 with the respective inner parts. The mechanism consists essentially of two quadrilateral or diamond-shaped linkages arranged in the manner of a pantograph or "lazy-tongs," between the pivot points 14, 23, 26 and 28, and 15, 23, 27 and 29, but in which one of the crossing members 14, 15 of the linkage is fixed and may be constituted by the framework of a trolley to which the wheel mounting is secured. For convenience of construction, however, this crossing member may also consist, as shown, of a bracket 30 which is mounted on the fixed pivots 14, 15. The other crossing member 26, 27, that is the lever 22, is pivotally connected at its centre on the fixed crossing member 14, 15 and is conveniently provided with a handle (not shown) whereby turning movement may be applied.

In the collapsed state shown in Fig. 1, the wheels 18, 19 lie side by side and approximately in one plane and it is a function of the mechanism to move them from this position to their operative position in which they lie preferably in parallel planes at right angles to the original plane. Movement of the wheels is effected by turning the lever 22 relative to the bracket 30. This movement, which is balanced with respect to gravity, at first causes the wheels 18, 19 on their arms 10, 11 to move outwardly a certain distance, each wheel and its arm swinging about the pivots 14, 15, and then the outer parts 16, 17 turn on the hinges 20, 21 through 90° to carry the wheels into their operative position. This latter part of the movement is effected by means of a ball sphere 32, 33 or the like which is carried on the outer parts 16, 17 of the arms 10, 11 and engages an L-shaped working face 34, 35 formed on the ends of the links 24, 25 where they are pivoted at 28, 29 with the inner parts 12, 13 of the wheel arms, the engagement between the ball sphere and the link face as the lever 22 and links 24, 25 move towards an approximately straight-line position causing the outer part of the wheel arm to pivot on the hinge 20, 21 out of the plane containing the linkage.

In the operative position shown in Fig. 2, the outer parts of the wheel arms are locked securely in position by engagement of the ball spheres 32, 33 with the working faces 34, 35 of the links 24, 25 and can only be released from this position by reversing the turning movement of the lever 22. Stops may be provided to prevent the outer parts of the arms moving beyond the operative position.

A handle may conveniently be provided for carrying the mounting in its collapsed state by forming a grip 38 on the inner part 12 of the wheel arm 10, the grip being so positioned that it lies in line with the centre of gravity of the collapsed mounting. In collapsed position the wheels may lie flat and in a common plane or alternatively they may be inclined slightly one to the other. Again, instead of the outer parts of the arms assuming in their operative position an angle of 90° to their position when collapsed, they may incline outwardly somewhat so as to increase the track width.

It will be appreciated that in the form of wheel mounting so far described the outer parts of the wheel arms will tend to drop into their operative positions when the arms are swung away from the collapsed position if the mounting is so positioned that the outer parts when in the operative position hang downwardly. The L-shaped cam faces 34, 35 then act by contact with the ball spheres 32, 33 to lock the outer parts in position. However, the L-shaped cam faces and the ball spheres will co-operate positively to urge the outer parts of the wheel arms into operative position if the mounting is positioned in a different manner. When the lever 22 is turned to collapse the mounting, the outer parts will only drop to the collapsed position if the mounting is positioned with these parts uppermost. To ensure positive movement of these outer parts, the L-shaped part of the links 24, 25 may be formed at its outer end with a hook portion 36, 37 which engages the ball spheres when the mechanism is in the operative position and causes these links to urge the ball spheres and with them the outer parts of the wheel arms towards the collapsed position during the initial stages of the collapsing operation.

Whilst in the mechanism described with reference to Figs. 1 and 2 levers and links with cam faces have been shown, the turning of the wheel arms about their fixed pivots may be effected by means of gearing, and the hinging of the outer parts of the arms by means of fixed cams or by cams mounted on the gears.

One form of collapsible wheel mounting arranged in this manner is shown in Fig. 3. In this arrangement the inner parts of the wheel arms comprise gear wheels 40, 41 which are mounted for rotation on fixed bearing pivots 42, 43 in engagement with an idler wheel 44 which rotates on the fixed bearing pivot 45. The outer parts 16, 17 of the wheel arms are generally the same as those of Figs. 1 and 2 and are hinged at 20, 21 to the inner parts 40, 41 in the same manner. The outer parts are again each provided with a ball sphere 32, 33 so that they can be moved into operative position when the arms are swung outwardly. In operation, when the wheel 44 is rotated the arms swing on the pivots 42, 43 and eventually the ball spheres engage the cam faces 46, 47 of the fixed member 48 which is mounted on the pivots 42, 43 and 45. This engagement causes the ball spheres to be urged radially outwardly from the respective pivots and thus the outer parts to be moved upwardly out of the plane of the drawing into operative position. In the final part of the movement of the inner parts 40, 41 of the wheel arms the ball spheres engage the hooked ends of the member 48 whereby they and the outer parts of the wheel arms are locked in the operative position.

In all the forms of the invention so far described it will be seen that if the wheel mounting is secured on the underside of a base member, which may form the base of a trolley, and which is somewhat larger than the overall size of the collapsed mounting, the mounting could be protected by a cover member which is provided with side slots through which the wheels would be swung on their arms when being moved into operative position.

It will be appreciated that instead of providing one central pivotal point (23 in Figs. 1 and 2), two or more may be provided on which the operating levers for each wheel mounting are separately pivoted, thereby dividing the linkages, but for the purpose of balancing the wheels and for the purpose of operating the mechanism from one point, the sets of links may be connected together by a further link or links or by other means such as gear wheels.

Figure 7:
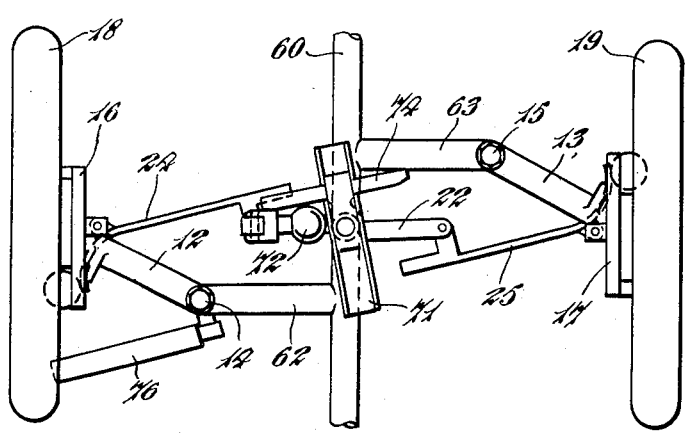

Figs. 4–7 illustrate a form of collapsible trolley in accordance with this invention which is suitable for carrying golf clubs. The wheel mounting is generally the same as that shown diagrammatically in Figs. 1 and 2 and the same reference numerals will be used to denote corresponding parts. The trolley consists of a central longitudinal member 60 which is provided with an upstanding part 61 intermediate its ends constituting the fixed pivot 23 and two side arms 62 and 63 arranged one above and the other below the part 61 and extending in opposite directions from the member 60 each formed with an upstanding end portion constituting the fixed pivots 14 and 15 respectively. As compared with Figs. 1 and 2 it will be seen that in this form of the wheel mounting the fixed pivots 14, 15 are staggered in relation to the longitudinal axis of the trolley or the line joining the wheel axes when they are collapsed. This enables the wheels to be collapsed closer to one another and at the same time in the case of the golf trolley enables an increase in the angle between the horizontal and the longitudinal axis of the trolley when it is in use.

The longitudinal member 60 is provided at its lower end with a foot 64 on which the end of a golf bag may rest and which may be moved from the collapsed position shown to an operating position at right angles to the member 60 as shown in the chain dotted line. The foot may include the arm members 65 and a strap or elastic cord 66 or the like joining these ends for holding the end of the bag in position. The upper end of the bag may be held similarly in a rest 67 which as shown may be collapsed along the member 60 or extended therefrom to the position shown in the chain dotted lines when the trolley is in use. This rest is designed so that when in use it holds the upper end of the golf bag in such position that the clubs therein are clear of the member 60 and because of its position when the trolley is in use tends to hold the bag stretched and therefore more firmly in position. Both the rest 67 and the foot 64 fold up against the member 60 as shown so that the overall dimensions of the collapsed trolley are not increased. The upper end of the member 60 is provided with a handle 68 which is carried on a rod 69 that telescopes within the member 60 and can be secured in a desired position by means of the clamp 70.

The wheel mounting is generally the same as that shown more diagrammatically in Figs. 1 and 2, the wheels 18, 19 being carried on wheel arms 10, 11 which consist of outer parts 16, 17, to which the wheels are secured, connected by hinges 20, 21 to inner parts 12, 13, which pivot on the fixed pivots 14, 15. The lever 22 pivoted at its centre on the fixed pivot 23 is connected at its ends by means of links 24, 25 with the inner parts 12, 13 and the cam faces 34, 35 on these links co-operate with the ball spheres 32, 33 carried on the outer parts 16, 17 of the wheel arms to move these parts into operative position and to lock them in this position, the sequence of movements being shown in Figs. 6 and 7. The outer parts 16, 17 of the wheel arm are prevented from moving through an angle of more than about 90° by means of stops provided on the hinge portion of the inner parts 12, 13 which contact the face of the outer parts when they are in operative position. The outer parts 16, 17 are held in place in the collapsed position by means of a bar 71 which is carried on a fixed pivot 23 in such position that the outer parts of the wheel arm slide beneath it during the final part of the collapsing movement.

Operation of the mechanism and the locking of it in both the collapsed and operative positions is effected by means of a turning handle 72 which is mounted on a hinge on the pivot 26 between the link 24 and the lever 22. When this handle is turned down on its hinge, as shown in Fig. 4, the shoulder 73 engages a cross bar 74 which is carried on the bar 71 and when forced slightly past the rod is locked in position and prevents movement of the mechanism. The handle may be lifted to turn the lever 22 about its fixed pivot and when the mounting is in the operative position shown in Fig. 7, if the handle is turned down again as shown, the shoulder engages the other end of the cross bar 74 and will then operate to lock the mechanism in the operative position. To facilitate the locking and to ensure that the mechanism is firm and rigid in each position, it is convenient to provide a certain elasticity in the linkage conveniently in the links 24, 25 and cam faces 34, 35. The engagement of the shoulder 73 with the cross bar 74 thus causes the mechanism to be held firmly against appropriate stops in each position and slackness or play can be taken up. This flexibility also ensures that despite slight variations such as may occur in manufacture, the pressure of each cam face 34, 35 of the links 26, 27 on the respective ball spheres 32, 33 will tend to be equalised. The links 24, 25 are also so arranged that their ends adjacent the pivots 26, 27 with the lever 22 engage the rim of the wheels when in collapsed position to prevent rotation.

As shown the end of the inner part 12 of the wheel arm 10 may be provided with a handle 76 so that the collapsed trolley may be carried, this handle being so positioned that it will be above the centre of gravity of the trolley when collapsed.

If desired in the form of wheel mounting shown in Figs. 4-7, the ends of the cam faces 34, 35 of the links 24, 25 may be formed with a hook or the like similar to that shown at 36, 37 in Figs. 1 and 2 so that the outer parts of the wheel arm may be moved positively into and out of their operative position.

What I claim is:

1. A collapsible trolley comprising two arms, each consisting of an inner part and an outer part, means mounting said inner parts for pivotal movement on axes offset in opposite directions to one another transversely of the trolley from a longitudinal axis of the latter, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part to an operative position at an angle to the inner part about said hinge axes and out of the plane of rotation of said inner parts so as to locate the wheels at least substantially parallel with one another on opposite sides of said longitudinal axis.

2. A collapsible trolley comprising two arms, each consisting of an inner part and an outer part, means mounting said inner parts for pivotal movement on axes offset in opposite directions to one another transversely of the trolley from a longitudinal axis of the latter, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located at least substantially on said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part to an operative position at an angle to the inner part about said hinge axes and out of the plane of rotation of said inner parts so as to locate the wheels at least substantially parallel with one another on opposite sides of said longitudinal axis.

3. A collapsible trolley comprising two arms, each consisting of an inner part and an outer part, means mounting said inner parts for pivotal movement on axes offset in opposite directions to one another transversely of the trolley from a longitudinal axis of the latter and offset in opposite directions to one another from a line perpendicular to said longitudinal axis, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane on the side of said line remote from the associated axis of said pivotal movement and with their axes located near said longitudinal axis and on opposite sides, respectively, of a transverse axis of the trolley, and said arms being movable in the same rotational direction as one another to operative positions with said inner parts extending away from said longitudinal axis, and said outer part of each arm being movable with respect to the associated inner part about said hinge axes and out of the plane of rotation of said inner parts to an operative position at an angle to the inner part so as to locate the wheels at least substantially parallel with one another on opposite sides of said longitudinal axis.

4. A collapsible trolley comprising a central framework, two arms, each consisting of an inner part and an outer part, means mounting said inner parts on said member for pivotal movement on axes offset in opposite directions to one another transversely of the trolley from a longitudinal axis of the latter offset in opposite directions to one another from a line perpendicular to said longitudinal axis, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane on the side of said line remote from the associated axis of said pivotal movement and with their axes located near said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part about said hinge axes and out of the plane of rotation of said inner parts to an operative position at an angle to the inner part so as to locate the wheels at least substantially parallel with one another on opposite sides of said longitudinal axis.

5. A collapsible trolley comprising a main framework, a pair of wheel-carrying arms each consisting of an inner part pivotally connected with said framework and an outer part hinged to said inner part on an axis disposed at an angle to the axis of said pivotal mounting, the pivotal axis of the two arms lying on opposite sides, respectively, of a longitudinal axis of said framework, an operating member pivotally mounted on said framework and connected on opposite sides of said longitudinal axis with the inner parts of the two wheel-carrying arms by means of respective links, abutments on the outer ends of said links engaging with abutments on the outer parts of said arms during movement of the links to move the inner parts of the arms to operative position so as to urge the outer parts of the arms to their operative positions and to prevent movement of said second abutments and of the outer parts of the wheel-carrying arms away from their operative positions with respect to the inner parts of said arms, and means for limiting movement of the outer parts of the wheel-carrying arms past their operative positions with respect to said inner parts.

6. A collapsible trolley comprising a main framework, a pair of wheel-carrying arms each consisting of an inner part pivotally connected with said framework and an outer part hinged to said inner part on an axis disposed at an angle to the axis of said pivotal mounting, the pivotal axis of the two arms lying on opposite sides, respectively, of a longitudinal axis of said frame, means for limiting movement of the outer parts of the wheel-carrying arms past their operative positions with respect to said inner parts, an operating member pivotally mounted on said frame between the wheels and connected on opposite sides of said longitudinal axis with the inner parts of the two wheel-carrying arms by means of respective links, abutments on the outer ends of said links engaging with abutments on the outer parts of said arms during movement of the links to move the inner parts of the arms to operating position so as to urge the outer parts of the arms to their operative positions and to prevent movement of said second abutments and of the outer parts of the wheel-carrying arms away from their operative positions with respect to the inner parts of said arms, and surfaces on said links engaging with said second abutments positively to urge the outer parts of the arms to their collapsed positions with respect to said inner parts on movement of said operating member to rotate the inner parts of said arms to the collapsed position.

7. A collapsible trolley as claimed in claim 5, in which relatively movable abutments mounted respectively on the operating member and the framework are engageable with one another in the operable position of said operating member to prevent movement of said operating member away from said operative position.

8. A collapsible trolley as claimed in claim 5, in which the operating member includes a handle portion pivotally mounted on said operating member for movement from a retracted position to an operating position with respect to said member and in which the framework carries an abutment engageable by said handle portion in the operating position of the latter to prevent movement of the operating member away from the operative position thereof.

9. A collapsible trolley comprising a pair of wheel-carrying arms each consisting of an inner part pivotally mounted on the trolley and an outer part hinged to said inner part on an axis disposed at an angle to the axis of said pivotal mounting, the pivotal axes of the two arms lying on opposite sides, respectively, of a longitudinal axis of the trolley, a rotational operating member connected on opposite sides of said longitudinal axis with the inner parts of the two wheel-carrying arms to rotate the latter about said pivotal axes, a pair of abutment surfaces, abutments on the outer parts of said arms co-operative with said abutment surfaces respectively during movement of said inner parts of the arms to operative position so as to urge said outer parts of the arms to their operative positions, and to prevent movement of said abutments and of said outer parts of the arms away from their operative positions with respect to the inner parts of said arms, and means for limiting movement of the outer parts of the wheel-carrying brackets past their operative positions with respect to said inner parts.

10. A collapsible trolley comprising two arms, each consisting of an inner part and an outer part, means mounting said inner parts for pivotal movement on axes offset in opposite directions to one another transversely of the trolley from a longitudinal axis of the latter, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part about said hinge axes and out of the plane of rotation of said inner parts to an operative position at an angle to the inner part so as to locate the wheels at least substantially parallel with one another on opposite sides of said longitudinal axis, gear teeth on said inner parts, and a gear wheel in mesh with said gear teeth for simultaneous movements of said arms between the collapsed and operative positions.

11. A collapsible trolley comprising two arms, each consisting of an inner part and an outer part, means mounting said inner parts for pivotal movement on axes offset in opposite directions to one another transversely of the trolley from a longitudinal axis of the latter, said outer parts being hinged to said inner parts respectively on hinge axes disposed at an angle to said first axis for pivotal movement of said outer parts out of the plane for rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and said arms being movable in the same rotational direction as one another to operative positions with said inner parts extending away fom said longitudinal axis and said outer part of each arm being movable with respect to the associated inner part about said hinge axes and out of the plane of rotation of said inner parts to an operative position at an angle to the inner part so as to locate the wheels at least substantially parallel with one another on opposite sides of said longitudinal axis, and fixed cam surfaces engageable with said outer parts to move said outer parts through an angle of substantially 90° relative to said inner parts as said inner parts are rotated.

12. A collapsible trolley comprising two arms, each consisting of an inner part and an outer part, means mounting said inner parts for pivotal movement on axes offset in opposite directions to one another tansversely of the trolley from a longitudinal axis of the latter, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and means constraining said inner and outer parts to lie in said collapsed positions, and means interconnecting said arms for movement in the same rotational direction as one another to operative positions with said inner parts extending away from said longitudinal axis, said outer part of each arm being movable with respect to the associated inner part about said hinge axes and out of the plane of rotation of said inner parts to an operative position at an angle to the inner part so as to locate the wheels at least substantially parallel with one another on opposite sides of said longitudinal axis.

13. A collapsible trolley comprising a main framework, a pair of wheel-carrying arms each consisting of an inner part pivotally connected with said frame and an outer part hinged to said inner part on an axis disposed at an angle to the axis of said pivotal mounting, the pivotal axes of the two arms lying on opposite sides respectively of a longitudinal axis of said framework, an operating member pivotally mounted on said framework and extending on opposite sides of said longitudinal axis, links connecting the oppositely extending parts of said operating member with said inner parts respectively to rotate said inner parts in the same rotational direction as one another about said pivotal axes to positions extending outwardly of said framework, extensions of said links co-operating with abutments on said outer parts to urge said outer parts to positions at an angle to said inner parts, and means for limiting said movement of the outer parts with respect to the inner parts.

14. A two-wheeled trolley suitable for carrying golf clubs and comprising a central longitudinal framework provided on one side with supports for the attachment of a receptacle for golf clubs and on the other side with a wheel supporting structure comprising two arms, each consisting of an inner part and an outer part, means mounting said inner parts for pivotal movement on said framework on axes offset in opposite directions to one another transversely of the trolley from a longitudinal axis of the latter, said outer parts being hinged to said inner parts respectively on hinge axes disposed at an angle to said first axis for pivotal movement of said outer parts out of the plane of rotation of said inner parts, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part about said hinge axes and out of the plane of rotation of said inner parts to an operative position at an angle to the inner part so as to locate the wheels at least substantially parallel with one another on opposite sides of said longitudinal axis.

15. A collapsible trolley comprising two arms, each consisting of an inner part and an outer part hinged to the inner part, means mounting said inner parts for pivotal movement on axes offset in opposite directions to one another transversely of the trolley from a longitudinal axis of the latter, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley and said arms being movable in the same rotational direction as one another to operative positions with said inner parts extending away from said longitudinal axis and said outer part of each arm being movable with respect to the associated inner part to an operative position at an angle to the inner part so as to locate the wheels at least substantially parallel with one another on opposite sides of said longitudinal axis, means for limiting movement of the outer parts of the wheel-carrying arms past their operative positions with respect to said inner parts, an operating member pivotally mounted on said frame between the wheels and connected on opposite sides of said longitudinal axis with the inner parts of the two wheel-carrying arms by means of respective links, and abutments on the outer ends of said links engaging with abutments on the outer parts of said arms during movement of the links to move the inner parts of the arms to operating position so as to urge the outer parts of the arms to their operative positions and to prevent movement of said second abutments and of the outer parts of the wheel-carrying arms away from their operative positions with respect to the inner parts of said arms.

16. A collapsible trolley comprising two arms, each consisting of an inner part and an outer part hinged to the inner part, means mounting said inner parts for pivotal movement on axes offset in opposite directions to one another transversely of the trolley from a longitudinal axis of the latter, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley and said arms being movable in the same rotational direction as one another to operative positions with said inner parts extending away from said longitudinal axis and said outer part of each arm being movable with respect to the associated inner part to an operative position at an angle to the inner part so as to locate the wheels at least substantially parallel with one another on opposite sides of said longitudinal axis, means for limiting movement of the outer parts of the wheel-carrying arms past their operative positions with respect to said inner parts, an operating member pivotally mounted on said frame between the wheels and connected on opposite sides of said longitudinal axis with the inner parts of the two wheel-carrying arms by means of respective links, abutments on the outer ends of said links engaging with abutments on the outer parts of said arms during movement of the links to move the inner parts of the arms to operating position so as to urge the outer parts of the arms to their operative positions and to prevent movement of said second abutments and of the outer parts of the wheel-carrying arms away from their operative positions with respect to the inner parts of said arms and surfaces on said links engaging with said second abutments positively to urge the outer parts of the arms to their collapsed positions with respect to said inner parts on movement of said operating member to rotate the inner parts of said arms to the collapsed position.

17. A two-wheel trolley suitable for carrying golf clubs and comprising a central longitudinal framework provided on one side with supports for the attachment of a receptacle for golf clubs and on the other side with a wheel supporting structure comprising two arms, each consisting of an inner part and an outer part hinged to the inner part, means mounting said inner parts for pivotal movement on said framework on axes offset in opposite directions to one another transversely of the trolley from a longitudinal axis of the latter, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part to an operative position at an angle to the inner part so as to locate the wheels at least substantially parallel with one another on opposite sides of said longitudinal axis, means for limiting movement of the outer parts of the wheel-carrying arms past their operative positions with respect to said inner parts, an operating member pivotally mounted on said frame between the wheels and connected on opposite sides of said longitudinal axis with the inner parts of the two wheel-carrying arms by means of respective links, and abutments on the outer ends of said links engaging with abutments on the outer parts of said arms during movement of the links to move the inner parts of the arms to operating position so as to urge the outer parts of the arms to their operative positions and to prevent movement of said second abutments and of the outer parts of the wheel-carrying arms away from their operative positions with respect to the inner parts of said arms.

18. A two-wheel trolley suitable for carrying golf clubs and comprising a central longitudinal framework provided on one side with supports for the attachment of a receptacle for golf clubs and on the other side with a wheel supporting structure comprising two arms, each consisting of an inner part and an outer part hinged to the inner part, means mounting said inner parts for pivotal movement on said framework on axes offset in opposite directions to one another transversely of the trolley from a longitudinal axis of the latter, two wheels journalled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, and said arms being movable in the same rotational direction as one another to operative positions with said inner parts extending away from said longitudinal axis and said outer part of each arm being movable with respect to the associated inner part to an operative position at an angle to the inner part so as to locate the wheels at least substantially parallel with one another on opposite sides of said longitudinal axis, means for limiting movement of the outer parts of the wheel-carrying arms past their operative positions with respect to said inner parts, an operating member pivotally mounted on said frame between the wheels and connected on opposite sides of said longitudinal axis with the inner parts of the two wheel-carrying arms by means of respective links, abutments on the outer ends of said links engaging with abutments on the outer parts of said arms during movement of the links to move the inner parts of the arms to operating position so as to urge the outer parts of the arms to their operative positions and to prevent movement of said second abutments and of the outer parts of the wheel-carrying arms away from their operative positions with respect to the inner parts of said arms and surfaces on said links engaging with said second abutments positively to urge the outer parts of the arms to their collapsed positions with respect to said inner parts on movement of said operating member to rotate the inner parts of said arms to the collapsed position.

19. A two-wheeled trolley comprising a longitudinal member, supports mounted on said member for carrying a receptacle for golf clubs, lateral members secured to said longitudinal member carrying pivots offset transversely of said longitudinal member on opposite sides respectively of the latter, a pair of wheel-carrying arms consisting of inner parts pivotally mounted on said pivots and outer parts hinged respectively to said inner parts on axes disposed each at an angle to the axis of said pivotal mounting, said pivots lying on opposite sides, respectively, of a longitudinal axis of the trolley, a rotational operating member connected on opposite sides of said longitudinal axis, with the inner parts of the two wheel-carrying arms to rotate the latter about said pivotal axes, a pair of abutment surfaces, abutments on the outer parts of said arms co-operative with said abutment surfaces, respectively during movement of said inner parts of the arms to operative positions so as to urge said outer parts of the arms to their operative positions, and to prevent movement of said abutments and of said outer parts, away from their operative positions with respect to the inner parts of said arms, and means for limiting movement of the outer parts of the wheel-carrying brackets past their operative positions with respect to said inner parts.

20. A collapsible trolley comprising a main framework, two arms each consisting of an inner part and an outer part, means mounting said inner parts for pivotal movement on said framework about axes offset in opposite directions to one another transversely of the trolley from a longitudinal axis of said framework, said outer parts being hinged to said inner parts, respectively, on hinge axes disposed at an angle to said first axes for pivotal movement of said outer parts out of the plane of rotation of said inner parts, two wheels journaled respectively on the outer parts of said arms, said inner and outer parts extending in a collapsed position of the trolley from said pivotal axes inwardly of the trolley towards said longitudinal axis to locate the wheels at least substantially in a common plane with their axes located near said longitudinal axis and on opposite sides, respectively, of a transverse axis of the trolley, an operating member pivotally mounted on said framework and extending on opposite sides of said longitudinal axis, links connecting the oppositely extending parts of said operating member with the two wheel-carrying arms, respectively, to rotate said inner parts in the same rotational direction as one another about said pivotal axes to operative positions extending outwardly of said framework and to provide movement of said outer part of each arm with respect to the associated inner part about said hinge axes and out of the plane of rotation of said inner parts, to an operative position at an angle to the inner part so as to locate the wheels at least substantially parallel with one another on opposite sides of said longitudinal axis.

References Cited in the file of this patent

UNITED STATES PATENTS

| | | |
|---|---|---|
| 1,276,067 | Hurd | Aug. 20, 1918 |
| 1,542,621 | Longstreet et al. | June 16, 1925 |
| 2,505,440 | Taber et al. | Apr. 25, 1950 |
| 2,517,065 | Watson | Aug. 1, 1950 |

FOREIGN PATENTS

| | | |
|---|---|---|
| 626,560 | Great Britain | Jan. 29, 1948 |